United States Patent [19]

Anderson

[11] Patent Number: 4,706,499

[45] Date of Patent: Nov. 17, 1987

[54] SINGLE PULSE IMAGING DEVICE USING HUYGENS WAVELET RECONSTRUCTION

[76] Inventor: Forrest L. Anderson, P.O. Box 1400, Bernalillo, N. Mex. 87004

[21] Appl. No.: 858,696

[22] Filed: May 2, 1987

[51] Int. Cl.[4] ............................................. G01N 29/04
[52] U.S. Cl. ......................................... 73/625; 73/628
[58] Field of Search ................ 73/625, 626, 606, 628, 73/597, 603; 129/660

[56] References Cited

U.S. PATENT DOCUMENTS

| Re. 30397 | 9/1980 | King | 128/660 |
|---|---|---|---|
| 3,676,584 | 7/1972 | Plakas et al. | 73/628 |
| 3,717,843 | 2/1973 | Farrah et al. | 73/606 |
| 3,918,025 | 11/1975 | Koshikawa et al. | |
| 4,131,022 | 12/1978 | Mezrich | 73/625 |
| 4,332,016 | 5/1982 | Berntsen | 73/628 |
| 4,395,909 | 8/1983 | Steinberg et al. | 128/660 |

OTHER PUBLICATIONS

Benneit et al., "Real Time Synthetic Aperture Digital Acoustic Imaging System", vol. 10, 1982.
Liang et al., #1, "Three Dimesional Synthetic Focus System", vol. 10, 1982.
Digital Computer Simulation Study of a Real-Time Collection, Post Processing Synthetic Focusing Ultrasound Cardiac Camera, Acoustical Holography, vol. 8, 1975, Plenum Press, New York.

Primary Examiner—Anthony V. Ciarlante

[57] ABSTRACT

A method and device for imaging three dimensions with a single pulse of energy is described. An embodiment is disclosed which uses a single monopolar transmitted pulse which radiates through a wide solid angular volume. Echoes caused by objects in this volume are detected by a large diameter, sparse circular array of receiver elements. The time history of each element is stored in a digital memory. A reconstruction processor uses this stored time history to reconstruct an image of the reflecting objects. A simple time of flight algorithm, based on Huygens principle, is used in the reconstruction. The algorithm automatically takes into account transmitted wave front curvature and makes no approximations such as Fresnel or Fraunhofer in the reconstruction. A circular array of receiver elements can be used, which is axicon, and is focused throughout the imaged volume. A perspective processor controls the reconstruction processor such that the volumetric image may be viewed from various perspectives. Tomographic images may be selected from the imaged volume at various positions and orientations. The perspective processor controls the reconstruction process such that the reconstructed points may be accumulated, summed and thus integrated so that a three dimensional volume may be viewed on a two dimensional display.

12 Claims, 6 Drawing Figures

SYSTEM BLOCK DIAGRAM

FIG-1

SYSTEM BLOCK DIAGRAM

FIG-2

PERSPECTIVE PROCESSOR

FIG-3

RECONSTRUCTION GEOMETRY

FIG-4

RECON ADDRESS GENERATOR

FIG-5

RECON SUMMER

FIG-6

ECHO PROCESSOR

SINGLE PULSE IMAGING DEVICE USING HUYGENS WAVELET RECONSTRUCTION

BACKGROUND OF THE INVENTION

1. Field of the Invention

This invention relates to the three dimensional imaging of objects using a single pulse of energy.

2. Description of the Prior Art

A previous patent application Ser. No. 799,424 describes a similar machine. However in that application the reconstruction process was carried out in two geometrical steps. In the first step the image was resolved with respect to each of two angular directions originating at the transmitting tranducer. In the second step the ranges along each two dimensional angular direction are resolved. This requires a complicated mathematical algorithm to be implemented in the reconstruction hardware, and in addition, mathematical approximations to the wavefield geometry may be required.

The previous approach essentially uses spherical coordinates originating at the center of the transmitting transducer. This yields a lateral resolution that is very small near the the transducer but grows larger as the distance from the transducer increases. However, a large aperture formed by a sparse array is capable of producing relatively uniform resolution for ranges equal to several diameters of the array. The previous approach shows an intermediate memory called the data memory which is used to store the three dimensional reconstructed field of reflecting objects. This is an intermediate memory since it must be further processed into a tomographic image or a two dimensional view through a three dimensional field of objects. The present invention can reconstruct tomograms or two dimensional views through three dimensional fields directly from the stored time history of the receiver elements. This increases the processing speed and reduces the amount of electronics by eliminating the requirements for an intermediate memory.

The final display will most likely be in rectangular coordinates whereas the previous approach reconstructs in spherical coordinates. This results in complex electronics being required in the implementation of the machine.

The transmitted wavefield from a small transducer emitting a pulse will approximate an expanding sphere at locations several diameters away from the transducer. This must be taken into account by the reconstruction processor or image degradation will occur. The previous approach makes no explicit provision for this and it would be hard to implement in such a two step reconstruction technique. The implementation would require look up tables or computation circuits for each reconstruction point and each receiver element. This would be hard to implement in real time and would use a large amount of electronics.

The present invention uses a round trip time of flight algorithm which automatically takes into account the curved nature of the wavefront propagating away from the transmitter. In addition no Fraunhofer or Fresnel approximations are made since the algorithm is essentially a Huygens wavelet based approach. It requires only the computation of the distance from the transmitter to the reconstruction point and computation of the distance from the reconstruction point to each receiver element.

SUMMARY OF THE INVENTION

This invention provides three dimensional imaging with the transmission of a single pulse of energy while using a sparse array of receiver elements to receive echoes unambiguously from a three dimensional field of objects. It will image a three dimensional volume in real time or near real time.

Additional objects are:

to provide a means of reconstructing a three dimensional image of objects using echoes caused by the transmission of a single pulse of energy.

to avoid grating lobes and other interference effects when using a sparse array of receiver elements.

to illuminate or insonify a wide angular volume uniformly with the transmission of a single pulse of energy.

to provide a means of viewing three dimensional data on a two dimensional display.

to provide a means for reconstructing an image which provides relatively uniform resolution throughout the imaged volume.

to use a simple reconstruction method which uses one geometrical step.

to use a reconstruction method which is based on rectangular coordinates.

to reconstruct the image of objects causing echoes directly from the stored time history of echoes received at each element of the receiver array.

to use a reconstruction algorithm which uses the combined distances or total round trip distance from the transmitter to the reconstruction point and from the reconstruction point to the receiver element as a basis for reconstruction.

to reconstruct three dimensional images and tomographic images directly from the array element time histories without the use of large intermediate memories.

to use a reconstruction algorithm which can reconstruct points in any order within the insonified three dimensional volume and thus facilitate the reconstruction of variously oriented volumes and tomograms viewed from various perspectives.

to use a reconstruction algorithm which allows a more efficient use of electronics used in the reconstruction.

to use a reconstruction algorithm which automatically takes into account the wavefront curvature of the transmitted pulse.

to use a reconstruction algorithm which makes no Fresnel, Fraunhofer, or similar approximations.

Further objects and advantages of this invention will become apparent from consideration of the drawings and descriptions of the preferred embodiment.

DESCRIPTION OF THE PREFERRED EMBODIMENT

Figure 1:
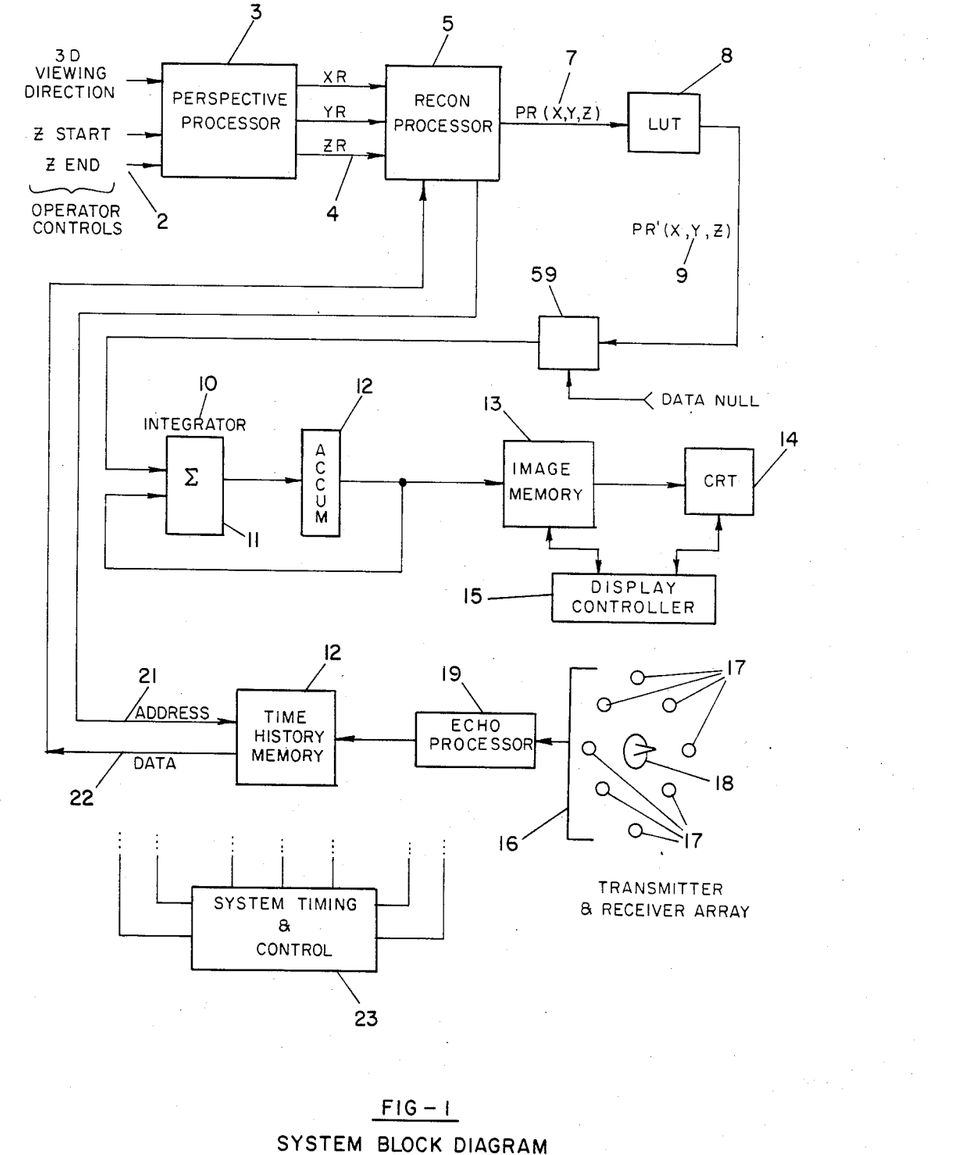
FIG. 1 shows a block diagram of the single pulse imaging system.

The apparatus described herein is a means of imaging three dimensions with the transmission and reception of a single pulse of ultrasonic energy. FIG. 1 is a system block diagram. A single transmitting element (18) is located at the center of a sparse circular array (17) of receiver elements. The transmitter emits a single unipolar pulse of energy. A multicycle pulse may be used if the echoes are converted to unipolar pulses by rectification at the receiver elements before further processing occurs. The pulse shape may be a half cycle sinusoid, a gaussian pulse or any other monopolar pulse. A gaussian shape is efficient in that it contains a relatively small higher harmonic content.

Most mediums to be imaged attenuate higher frequencies more than lower frequencies. The ratio of the diameter of the transmitter to the length of the transmitted pulse determines the size of the solid angle that will be insonified uniformly. As the pulse propagates away from the transmitter, objects in its path will generate echoes that propagate back toward the receiver array. These echoes are detected by the elements (17) of the receiver array. Because a unipolar pulse is used, the receiver array elements may be spaced far apart creating a large sparse aperture which will have better lateral resolution than the same number of elements configured into a dense array. With a unipolar pulse no grating lobes will occur. The echoes detected at each receiver element are amplified, processed and digitized by the echo processor (19) and then stored in time history member (12). System timing and control (23) synchronizes, controls and coordinates the various elements of the imaging apparatus. The perspective processor (3) is responsive to the operator controls (2) which determine the direction or perspective from which the final image will be viewed. The perspective processor also allows the operator to determine the thickness of the three dimensional volume which will be viewed on the final two dimensional display (14). This is done by removing front portions and rear portions of the image in a direction orthogonal to the viewing screen (14). The thickness of the portions to be removed are determined by the z start and z end operator controls (2). By using these controls the image may be reduced to a tomogram located at any position orthogonal to the viewing screen. The three dimensional viewing direction is also an operator control (2) and allows the imaged volume to be viewed from the front, back, top, bottom, right side, or left side. This, in conjunction with the z start and z end controls, allow viewing of the imaged volume from six different directions and also allow viewing volumetric images of various thicknesses, positions and orientations in addition to tomographic images of various positions and orientations. The perspective processor (3) sequences the three dimensional reconstruction points coordinates (4) that are fed to the recon processor (5). It does this in such a manner that fixed sequences of reconstructed points (7) may be summed by the integrator (10) and the results stored in the accumulator (12) to form one pixel at a time of the final two dimensional view through the three dimensional volume. The look up table (8) provides a means of shading the two dimensional view through the three dimensional volume so that a front to back gray scale perspective is formed. The look up table can also be used for other image processing functions by programming its contents with other values. The look up table mapped, reconstructed points (9) are fed to the integrator (10). The adder (11) sums these points with the data in the accumulator (12) and replaces the data in the accumulator with the results. This process constitutes a weighted integration of the reconstructed three dimensional volume in a direction orthogonal to the screen of the final two dimensional display (14). The integrated three dimensional data sequences each form one pixel in the two dimensional image memory (13). The data in this memory is converted to a composite video signal by the display controller (15) and is used to drive the cathode ray tube (14).

DETAILED DESCRIPTION OF THE PREFERRED EMBODIMENT

Figure 3:
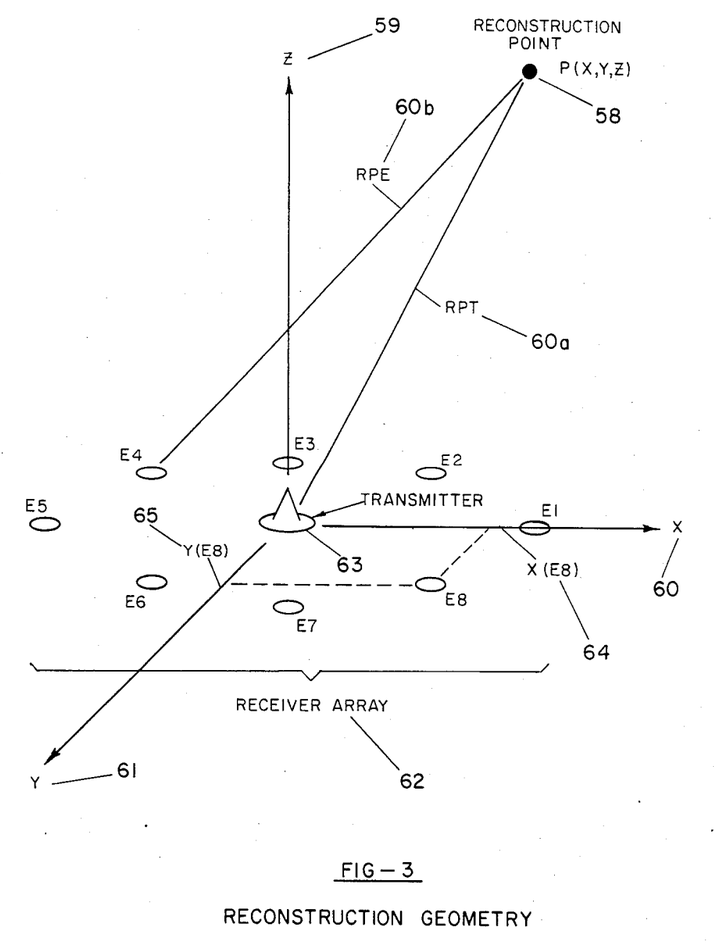
FIG. 3 shows the reconstruction geometry including transmitter and receiver and also the particular point to be reconstructed.

FIG. 3 is a drawing of the reconstruction geometry. The receiver array is in the x y plane and consists of a sparse array of receiver elements (62) evenly spaced on the circumference of a circle. Thus in this embodiment the receiver is an axicon constructed with a sparse array. The transmitter (63) is located at the origin of the x y z coordinate system and transmits a pulse in the z direction. An example reconstruction point is shown at (58). RPE (60b) represents the distance that an echo must travel from the reconstruction point (58) to receiver element E4. RPT (60a) represents the distance that an acoustic pulse must travel from the transmitter (63) to the reconstruction point (58). The sum or total distance (RPT+RPE) represents the total distance (combined or round trip distance) from transmitter to the reconstruction point and back to a receiver element.

Figure 6:
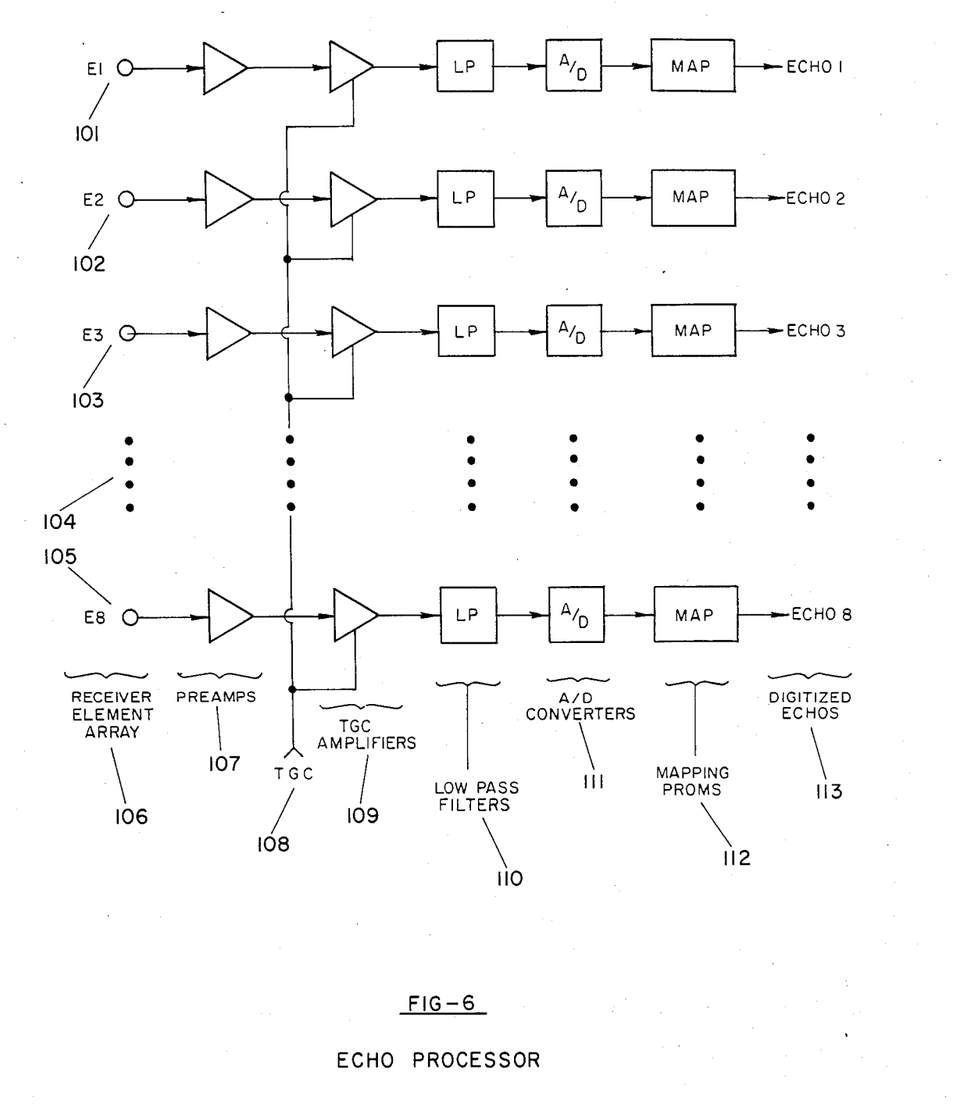
FIG. 6 shows the echo processor which first receives the echo data from the receiver elements.

FIG. 6 shows the echo processor which receives echo data from the receiver arrays elements (106). The preamplifiers (107) increase the magnitude of the echoes to reduce the effects of noise further along in the system. The time gain compensation amplifiers (109) provide a time varying gain to compensate for attenuation in the imaged medium which is a function of the echoes time of flight. The tgc input (108) consists of an adjustable ramp which increases the gain for echoes coming from reflectors further away from the receiver array. The low pass filters (110) are necessary to prevent aliasing. The analog to digital converters (111) convert the echoes to digital samples. The mapping proms (112) can be used for various types of dynamic range compression or expansion while the data is in sampled wavefield form. The output signals are the digitized echoes (113).

FIG. 1 (12) shows the time history memory which receives the processed and digitized echo data from the echo processor. This memory consists of two alternating memories, one being read into while the other is being read out of. The data in the memory is a sampled and processed replica of the time history of the wavefield incident on the surface of the receiver array.

Figure 2:
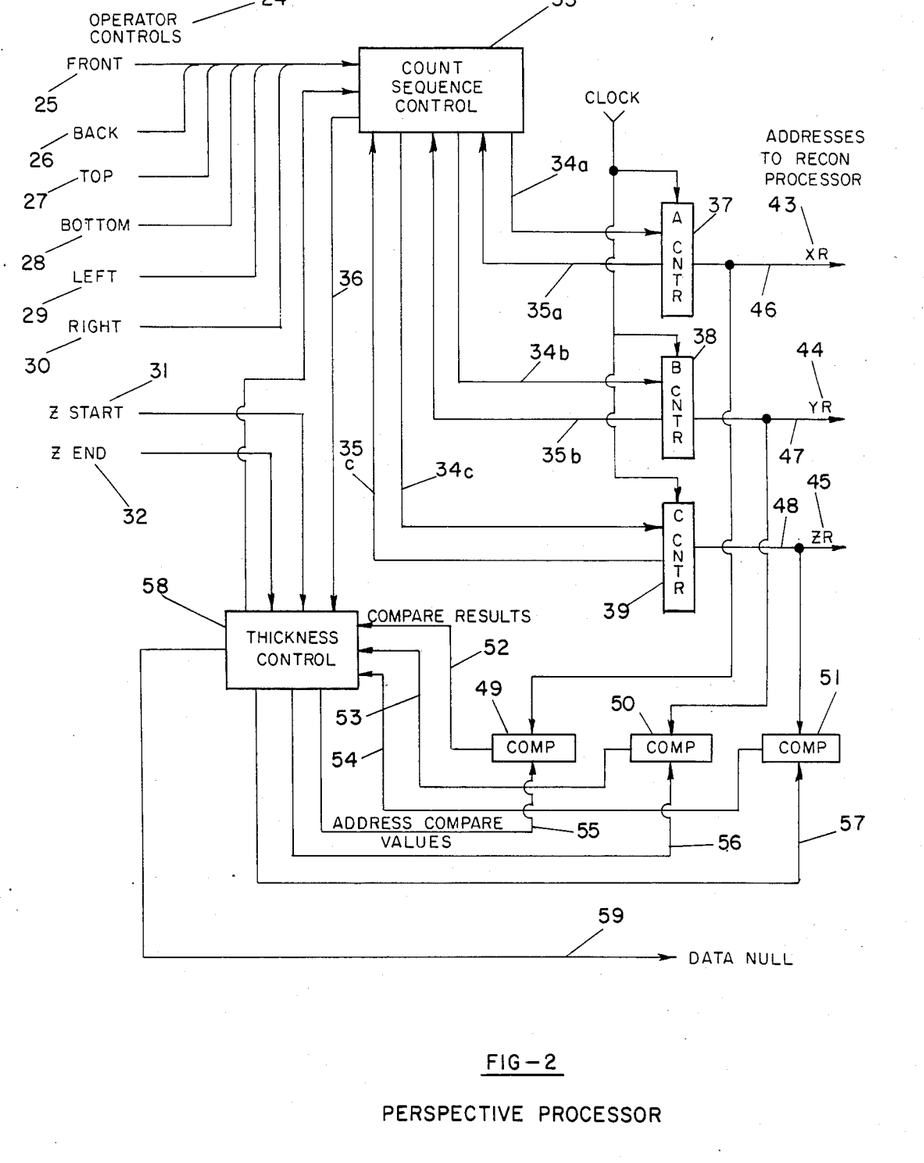
FIG. 2 shows a block diagram of the perspective processor which controls the reconstruction sequence to generate three dimensional or tomographic views from user selectable perspectives.

FIG. two is a block diagram of the perspective processor. The perspective processor controls the direction from which the three dimensional imaged volume is viewed. It also controls the thickness of the tomographic images and their location within the imaged volume and, in addition, the thickness of the tomogram.

The count sequence control (33) accepts inputs from the operator controls (24) and configures the counter control lines (34a), (35), (34b), (35b), (34c), (35c) to the address sequence counters (37), (38), (39). It does this such that the correct sequence of reconstruction point addresses (43), (44), (45) are fed to the recon processor. The counter control lines configure the counters in count up or count down mode, preset them to the correct value, and determine the interconnection of the carry in and carry out signals. The thickness control (58) accepts z start (31) and z end (32) operator controls and monitors the counter values (46), (47), (48) by loading comparison values (55), (56), (57) into the comparators (49), (50), (51). If the counter values are outside the range as determined by the z start (31) and z end (32) controls it activates the data null signal (59) which causes data values of zero to be fed into the integrator FIG. 1, (59), (10).

Figure 4:
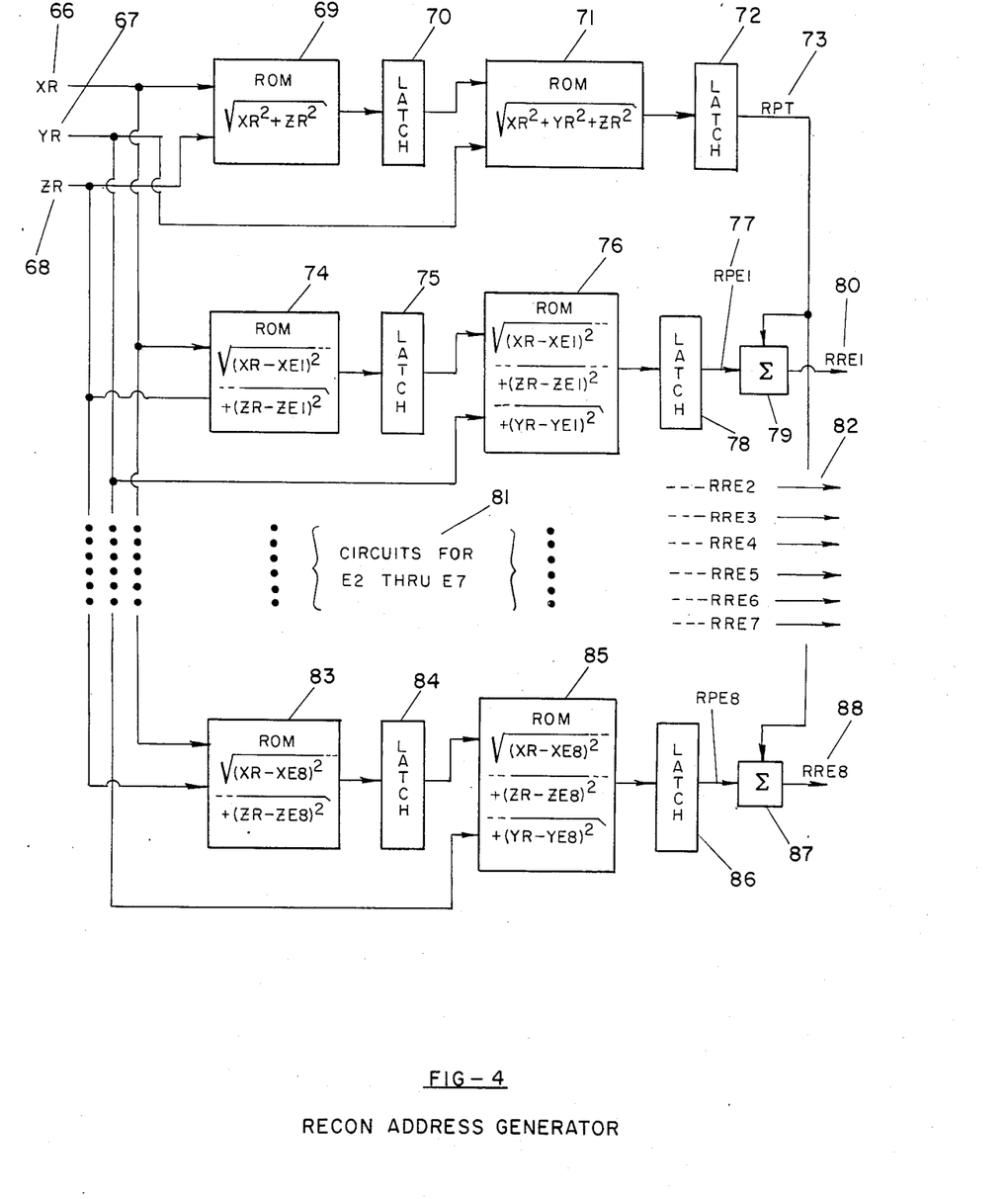
FIG. 4 shows the reconstruction address generator which takes the reconstruction point coordinates as an input and computes the appropriate time history addresses as outputs.
Figure 5:
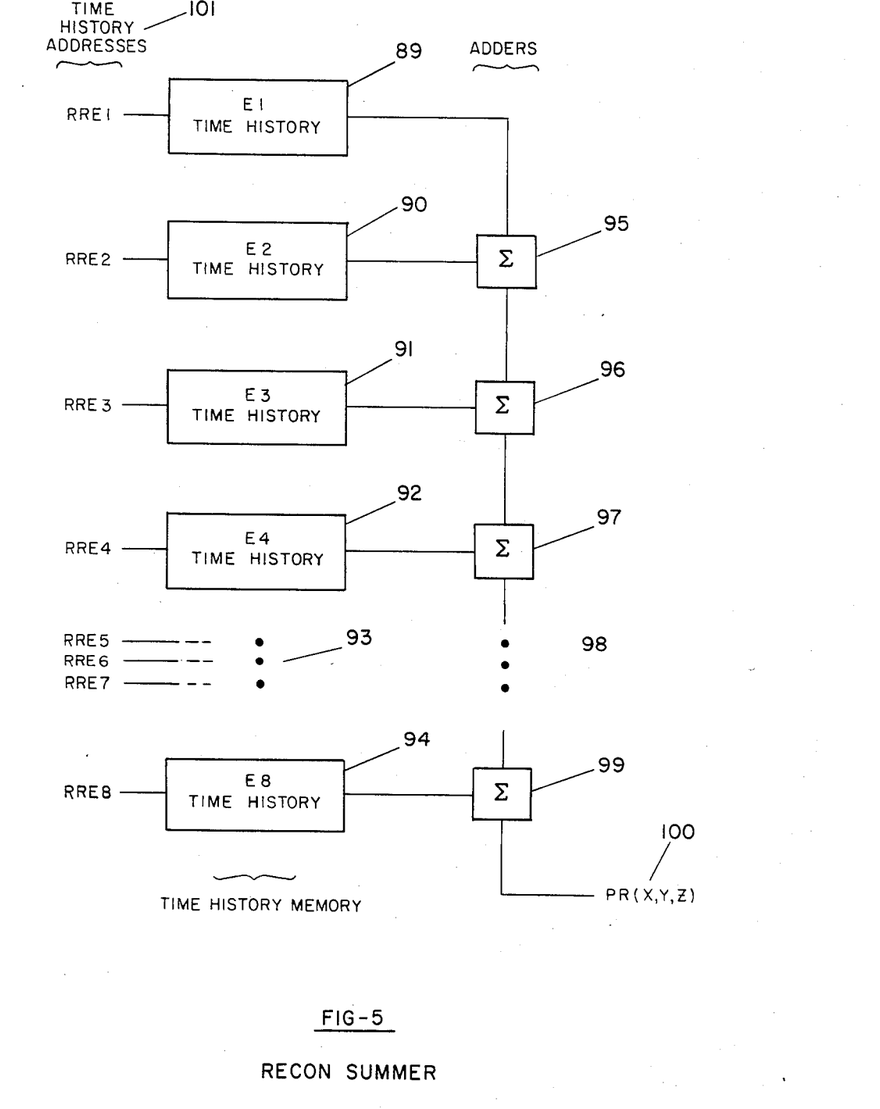
FIG. 5 shows the reconstruction summer which sums the appropriate time history data together to reconstruct an object field point.

FIG. 4 is a block diagram of the reconstruction address generator. The reconstruction address generator 20 sends a steam of addresses to the reconstruction summer (FIG. 5) which controls the way in which the time history memory data (FIG. 1—12) is summed to reconstruct image points. The reconstruction algorithm is implemented in hardware by programmable logic and is a parallel pipelined structure. For each point to be reconstructed in the three dimensional volume (xr,yr,zr) (66,67,68) the recon address generator computes the appropriate addresses for the recon summer (FIG. 5). Given the reconstruction point coordinates the time of flight from the transducer to the point rpt (73) is computed by the two programmed roms (69, 71). To minimize rom size the first rom computes the distance to xr,zr and the second rom takes this distance and the zr coordinate and computes the final distance rpt. The rest of the rom circuitry is used to compute the distances from the reconstruction point to each of the receiver elements. Their are eight sets of roms similar to the two roms (74, 76). Each set is programmed to compute the distance for one of the eight receiver elements e1 through e8 (FIG. 3). The first rom of each rom pair computes the distance projected in the x z plane and the second rom takes this distance along with the y coordinate of the reconstruction point and computes the final distance rpe (77). The summers (79, 87) sum two the distances together to form the total distance from the transmitter to the reconstruction point and back to the receiver element (FIG. 3) for each receiver element in the receiver array. The speed of sound is used as a scale factor in producing the output addresses (80, 82, 88) which are sent to the reconstruction summer (FIG. 5). The separate rom pairs for each element form the parallel architecture whereas the latches (70, 72, 75, 77, 84, 86) form a pipelined architecture in that the reconstruction speed is governed by the single slowest element in the circuit rather than by a sum of circuit element delays.

FIG. 5 shows the reconstruction summer (recon summer) which adds the appropriate time history data together to reconstruct each image point. The time history addresses (101) are generated by the reconstruction address generator (FIG. 4) and cause the appropriate data to be accessed in each elements time history memory (89, 90, 91, 92, 93, 94). This data is summed by the adders (95, 96, 97, 98, 99) to form the reconstructed point pr(x,y,z) (100).

FIG. 1 which is a system block diagram shows the integrator (10), the image memory (13), the crt display (14), and the display controller (15). These components function together to provide a display of the three dimensional image volume or selected tomographic images. The integrator receives reconstructed points from the reconstruction processor (5) in a sequence consisting of subsequences such that the summation of each subsequence forms one pixel for the two dimensional display. Each pixel then represents a view along a line through a three dimensional volume. The integrator forms these subsequence summations by using results fed back from the accumulator (12). The resulting pixels are placed in the appropriate locations in the image memory (13). The image memory consists of two alternating memories, one in read mode and one in write mode. The display controller (15) forms a composite video signal using the data in image memory and the video synchronization signals. This video signal is fed to the cathode ray tube (14).

While the above description contains many specifies, these should not be construed as limitations on the scope of the invention, but as an example of one preferred embodiment. For example, the preferred embodiment uses an acoustic pulse which is one type of radiated mechanical energy which, in general, includes all types of vibrations within matter. Some other examples are: siesmological sounding pulses caused by explosions or impact of instruments on the earths surface, underwater sonar pulses, medical ultrasound pulses, acoustic pulses in the air, and vibrational pulses in solid materials such as are used in nondestructive testing.

The invention could be implemented with other forms of energy such as electromagnetic waves. Some examples of which are radar pulses, xrays, and light pulses. The implementation would be analogous to the acoustic implementation with the timing circuits adjusted for the different velocity of propagation and with electromagnetic receivers and transmitters used instead of their acoustic counterparts.

In general, embodiments of the invention using different forms of wave energy are analogous to each other, differing in circuit timing and types of transmitters and receivers. The transmitters and receivers would typically be commonly available types of components.

What is claimed is:

1. A means for creating an image of a three dimensional volume containing objects utilizing a device comprising:
    (a) A means for transmitting a single pulse of energy which will propagate through a wide angular volume uniformly;
    (b) A means for detecting echoes caused by points, on the objects in the three dimensional volume, in the path of propagation of the single pulse of energy, having three or more sparsely spaced receiver elements;
    (c) A means for successively sampling echoes, caused by objects in the path of the propagating pulse, received at each receiver element, as a function of time;
    (d) A means for storing the successive samples wherein there is created a time history of echoes;
    (e) A means for selecting samples from the time history and combining them so as to reconstruct points within images of objects in the path of the single pulse of energy comprising:
        (aa) A means for determining each total distance (RPE+RPT) from each receiver element to the reconstructon point, on or within an object, and back to the transmitter;

(bb) A means for using each total distance as an address for the time history memory to select an echo sample for each receiver element;

(cc) A means for combining the selected echo samples so as to reconstruct an image of the point;

(dd) A means for repeating steps (aa) through (cc) for each point in the three dimensional volume so as to reconstruct an image of objects in the volume.

2. A means for creating an image of a three dimensional volume containing objects, with a single pulse of transmitted energy, utilizing a device comprising:

(a) A means for transmitting the single pulse of energy so that it will propagate through a wide angular volume uniformly;

(b) A means for detecting echoes caused by points, on or within the objects in the three dimensional volume, in the path of propagation of the single pulse of energy, having three of more sparsely spaced receiver elements;

(c) A means for successively sampling the echoes, at each receiver element, as a function of time, wherein each sample, at a particular receiver element, at a particular sampling time, represents echoes from points having the total distance (RPT)+(RPE) from the transmitter to the point and back to the particular receiver element, and each succeeding sample at a particular receiver element represents echoes from points with a greater total distance than the preceding sample;

(d) A means for storing the successive samples from each receiver element in a memory for each receiver element so as to create a time history of echoes resulting from points on objects in the path of the single pulse of energy;

(e) A means for selecting samples from the time history memories and combining them so as to reconstruct images of points on or within objects in the path of the single pulse of energy, wherein said images of points may be reconstructed in any order, said means comprising:

(aa) A means for computing the distance (RPT) from the transmitter to a point, the image of which is to be reconstructed;

(bb) A means for computing the distances (RPE) from each particular receiver element to the point;

(cc) A means for combining the distance (RPT) with each of the particular distances (RPE) so as to form a combined distance (RRE), for the point, for each particular receiver element;

(dd) A means for using each particular combined distance as an address for each particular receiver element's time history memory to select an echo sample from each time history;

(ee) A means for combining the selected echo samples so as to reconstruct an image of the point;

(ff) A means for repeating steps aa) through ee) for each point in the three dimensional volume so as to reconstruct an image of objects in the volume.

(f) A means for repeating (a) through (e) so as to repeatedly reconstruct the the reconstructed image.

3. A means for imaging a three dimensional volume, with a single transmitted pulse of energy, using a sparse array, utilizing a device comprising:

(a) A means for generating the pulse of energy so that it will propagate uniformly, without significant angular variations in amplitude, and without significant interference effects, through a wide solid angle;

(b) A means, which is the sparse array, for detecting echoes, caused by points within the three dimensional volume, comprising a receiver array having a plurality of three or more sparsely spaced receiver elements arranged approximately in a circle;

(c) A means for sampling echoes detected at each receiver element periodically as a function of time so as to form a sequence of echo samples from each receiver element;

(d) A means for generating a time history for each receiver element by storing the sequence in a memory;

(e) A means for selecting a sample from each of the time histories, for each point to be reconstructed, wherein said means uses the total distance (RPT+RPE) from the transmitter to the reconstruction point back to the particular receiver element as an address to select the sample;

(f) A means for combining together a sample from the time history of each receiver element to form an image of the point to be reconstructed;

(g) A means for repeating steps (a) through (f) so as to reconstruct an image of the points within the three dimensional volume;

(i) A means for repeating steps (a) through (g) so as to repeatedly reconstruct the image of the three dimensional volume.

4. The device according to claim 1, 2, or 3 wherein the single pulse of energy is mechanical.

5. The device according to claim 4 wherein the pulse is a unipolar pulse.

6. The device according to claim 5 wherein the single pulse of energy is ultrasound.

7. The device according to claim 6 wherein the image is reconstructed directly from the time history memories.

8. The device according to claim 7 wherein the image is composed of two separate images, one being a three dimensional image and the other a tomogram selected from within the three dimensional image.

9. The device according to claim 8 wherein the distance RPT (FIG. 4—73) is computed by a set of ROMs (FIG. 4—69,71) and each of the distances RPE (FIG. 4—77) for each receiver element is computed simultaneously by other sets of ROMs (FIG. 4—76,85,& 81), next the resulting distances RPT and RPE being added together by an adder (FIG. 4—79,87 & 81) for each receiver element to form a total distance RRE (FIG. 4—80,82,88) for each receiver elements time history (FIG. 5—89,90,91,92,93,94), these total distances being used in parallel as addresses (FIG. 5—101) to simultaneously access a sample from each time history which are then simultaneously added (FIG. 5—95,96,97,98,99) together to reconstruct a point PR(x,y,z) (FIG. 5—100) of the reconstructed image.

10. The device according to claim 1, 2, or 3 wherein the single pulse of energy is a mechanical multicycle cycle pulse which is converted to a unipolar pulse.

11. The device according to claim 1, 2, or 3 wherein the single pulse of energy is an electromagnetic unipolar pulse.

12. The device according to claim 1, 2, or 3 wherein the pulse is an electromagnetic multicycle pulse which is converted to a unipolar pulse.

* * * * *

UNITED STATES PATENT AND TRADEMARK OFFICE
CERTIFICATE OF CORRECTION

PATENT NO. : 4,706,499

DATED : November 17, 1987

INVENTOR(S) : Forrest L. Anderson

It is certified that error appears in the above-identified patent and that said Letters Patent is hereby corrected as shown below:

The term of this patent subsequent to August 25, 2004, has been disclaimed.

Signed and Sealed this

Fifth Day of January, 1988

*Attest:*

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO. : 4,706,499

DATED : November 17, 1987

INVENTOR(S) : Forrest L. Anderson

It is certified that error appears in the above-identified patent and that said Letters Patent is hereby corrected as shown below:

```
On the title page, item (22) "May 2, 1987" should
read -- May 2, 1986 --.
```

Signed and Sealed this

Fifth Day of July, 1988

Attest:

DONALD J. QUIGG

*Attesting Officer*  *Commissioner of Patents and Trademarks*